United States Patent [19]
Horiuchi et al.

[11] Patent Number: 5,297,246
[45] Date of Patent: Mar. 22, 1994

[54] PRINTER SYSTEM AND OPERATING METHOD THEREFOR

[75] Inventors: Yuichi Horiuchi, Hitachi; Syoichi Ito, Ibaraki, both of Japan

[73] Assignee: Hitachi, Ltd., Tokyo, Japan

[21] Appl. No.: 845,366

[22] Filed: Mar. 5, 1992

Related U.S. Application Data

[63] Continuation of Ser. No. 700,309, May 8, 1991, abandoned, which is a continuation of Ser. No. 320,596, Mar. 8, 1989, abandoned.

[30] Foreign Application Priority Data

Mar. 11, 1988 [JP] Japan ................. 63-56035

[51] Int. Cl.$^5$ .............................................. G06F 15/62
[52] U.S. Cl. ..................................... 395/150; 395/110
[58] Field of Search ............... 340/747, 750, 798, 799; 395/102, 110, 150, 151, 114, 162, 164

[56] References Cited

U.S. PATENT DOCUMENTS

| | | | |
|---|---|---|---|
| 4,641,263 | 2/1987 | Perlman et al. | 364/519 |
| 4,754,428 | 6/1988 | Schultz et al. | 364/900 |
| 4,811,242 | 3/1989 | Adachi | 364/519 |
| 4,839,829 | 6/1989 | Freedman | 364/519 |
| 4,853,865 | 8/1989 | Sansone et al. | 364/464.02 |
| 4,860,219 | 8/1989 | Schulz et al. | 364/519 |
| 4,924,409 | 5/1990 | Fukunaga | 364/518 |
| 4,939,670 | 7/1990 | Freiman et al. | 364/519 |
| 5,065,343 | 11/1991 | Inoue | 395/162 |
| 5,093,903 | 3/1992 | Sudoh | 395/102 |
| 5,093,906 | 3/1992 | Crozier | 395/150 |
| 5,137,379 | 8/1992 | Ukai et al. | 395/110 |

Primary Examiner—Phu K. Nguyen
Attorney, Agent, or Firm—Antonelli, Terry, Stout & Kraus

[57] ABSTRACT

In a printer system wherein one or a plurality of host computers use in common a single printer such as an expensive photo printer for electronic publishings of desktop publishings such as word processors, character format data of characters to be printed out is stored beforehand as character pattern data at a printer controller of the printer system. The host computer either stores minimum necessary character pattern data for monitor display or control, or stores no character pattern data. The character pattern data necessary for monitor display or control are used by transferring them from the printer controller to the host computer.

6 Claims, 6 Drawing Sheets

PRINTER SYSTEM AND OPERATING METHOD THEREFOR

This application is a continuation of application Ser. No. 700,309, filed May 8, 1991, now abandoned which is a continuation of application Ser. No. 320,596, filed Mar. 8, 1989, now abandoned.

BACKGROUND OF THE INVENTION

The present invention relates to an improvement on a printer system wherein at least one host computer connected to a printer supplies data to the printer to print out corresponding image data, and more particularly to an improvement on a method of operating a printer system wherein a plurality of host computers use in common a single high quality printer such as a laser printer to print out according to data supplied from the computers.

In known printer systems such as photoprinters used for electronic publishings or desktop publishings such as word processors, several proposals have been hitherto made to effectively utilize memories for storing print data or like (e.g., U.S. patent application Ser. No. 145312 entitled "Method of controlling photo printer and apparatus therefor", filed on Jan. 19, 1988, by Takagishi et al and assigned to Hitachi Ltd.; or U.S. patent application Ser. No. 225782 entitled "Photo printer having a host computer support and method of controlling the same", filed on Jul. 29, 1988, by Kawamata et al and assigned to Hitachi Ltd., both being still pending) a printer is connected via data communication means to a host computer which supplies data, such as graphs, figures, photographs, characters and the like to the printer. Character pattern data for characters to be printed are stored beforehand in a memory of the host computer as well as in a memory of a printer controller of the printer. Character pattern data corresponding to inputted data is read out from the memories and converted into corresponding character image data to be printed out by a printer engine of the printer. One of such conventional system arrangements adopts a character data transfer method (Japanese Patent Laid-open Publication JP-A-61-134791). According to the method, the memory of the host computer stores therein main character pattern data, whereas the memory of the printer controller stores therein supplementary character pattern data. Character pattern data not stored in the memory of the printer controller is accessed by the host computer and transferred from the host computer to the printer controller. The character pattern data stored in the memory of the host computer is used as print data and also as display data on a CRT of the host computer for monitoring and controlling the printing.

The resolution of the image at the printer output side is required to be high so as to obtain a high print quality. In view of this, the resolution at the printer output side is set, e.g, at 48×48 dots in spite of the resolution of 24×24 dots of the CRT screen of the host computer. Therefore, with such a conventional method by which character pattern data stored at the host computer is transferred to the printer controller, the data amount to be transferred becomes large, posing a problem of long transfer time.

Apart from the above, various character types and sizes are used for applications, such as electronic publishing or desktop publishings and the like, so that the capacity of a memory storing such voluminous character pattern data becomes large. In the case where a single printer (printer controller) is used with a plurality of host computers connected thereto, every host computer has the same character pattern data in duplicate, thus posing a problem of a large memory capacity of the overall system.

SUMMARY OF THE INVENTION

It is an object of the present invention to provide a printer system and operation method for the system which is capable of solving the above problems associated with the conventional technique, by adopting a method of transferring character pattern data stored at a printer controller to a host computer. Namely, according to the present invention, the memory of the printer controller stores therein character pattern data for characters to be printed out, whereas the memory of the host computer either stores no such character pattern data at all or stores less character pattern data for control purposes According to one aspect of the present invention, there are provided a printer system operating method and apparatus capable of reducing the amount of character pattern data transferred between a printer controller and a host computer, thus reducing the transfer time of the character pattern data.

According to another aspect of the present invention, there is provided ,a printer system operating method, and apparatus therefor, which is capable of reducing the memory capacity of an overall system for the case where a printer controller is used with a plurality of host computers.

With the first aspect of the present invention, the amount of character pattern data transferred from the printer controller, which uses high resolution character pattern data, to the host computer, which uses low resolution character pattern data, can be reduced as compared with a conventional transfer amount of character pattern data from the host computer to the printer.

With the second aspect of the present invention, character pattern data stored in the printer controller for printing purposes can be used in common by every host computer so that such character pattern data is not required to be stored at each host computer. Therefore, the memory capacity of each host computer and hence the overall size of the system can be made small.

DESCRIPTION OF THE PREFERRED EMBODIMENTS

Figure 1:
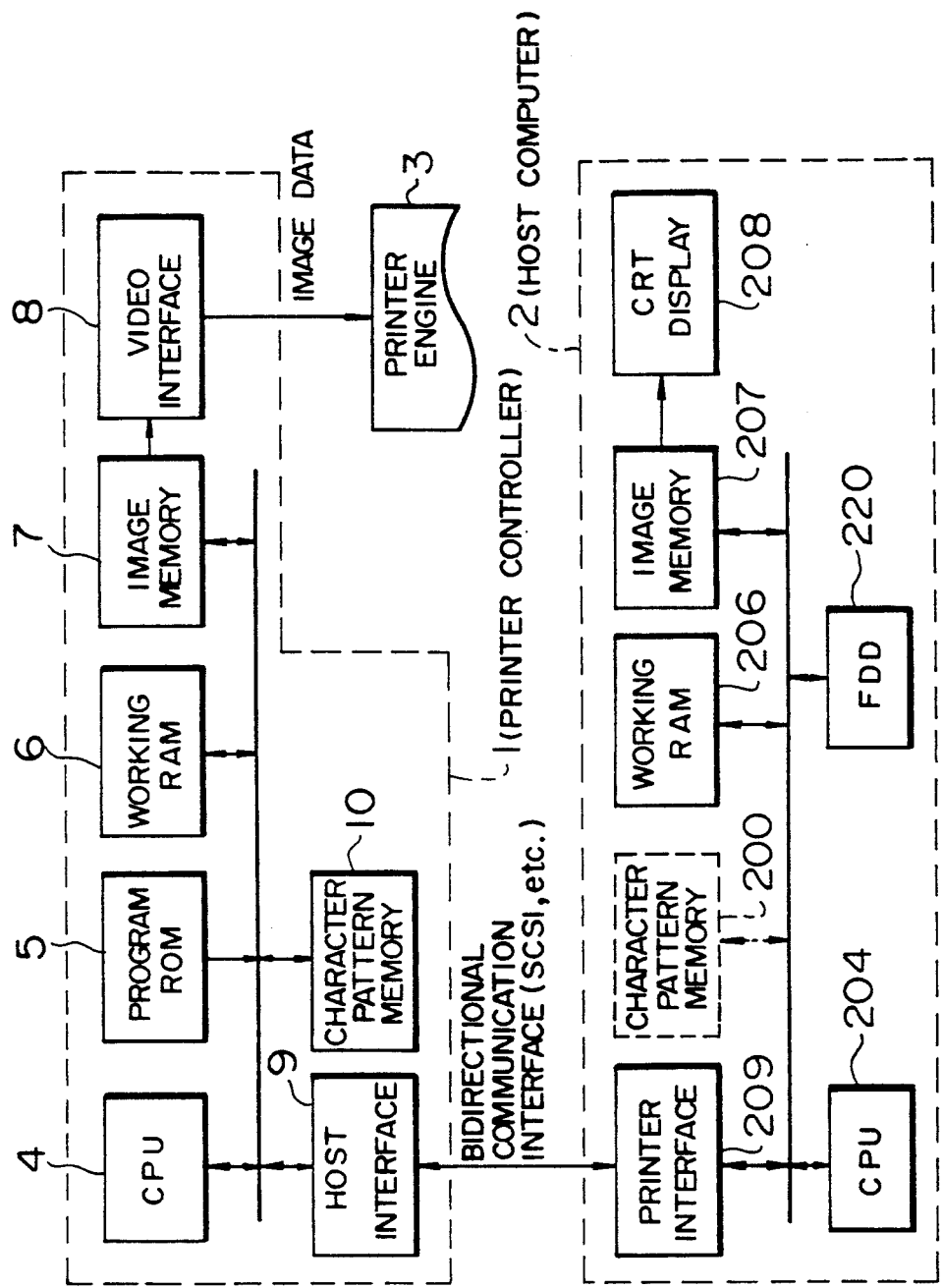
FIG. 1 is a block diagram showing an overall system arrangement of one embodiment of the present invention applied to a photo printer.

Referring to FIG. 1 showing the overall arrangement of a printer system of an embodiment of this invention, a host computer 2 transfers data for characters to be printed to a printer controller 1. The printer controller 1 analyzes the print data sent from the host computer 2 and converts the data into image data which is transferred to a printer engine 3. The printer engine 3 constructed of a printer, such as a laser printer, prints out dot data corresponding to the image data on a printing sheet.

The operation of the printer controller 1 will be described in detail. CPU 4 executes instructions in accordance with programs stored in program ROM 5. Working RAM 6 is used for temporary storage of data during execution of programs. Upon reception of data from a printer interface 209 of the host computer 2 via a high speed BIDIRECTIONAL communication interface, such as SCSI, a host interface 9 stores the data in its latch. Thereafter, the host interface 9 interrupts CPU 4 to inform the latter of the data transfer from the host computer 2. CPU 4 analyzes the data; and if the data indicates an operation of a character print, the CPU 4 reads a corresponding dot pattern of the character from a character pattern memory 10, and transfers the readout dot pattern to an image memory 7. The character pattern memory 10 stores therein various character pattern information necessary for drawing characters, such as character dot pattern information, character outline coordinate information, character skeleton vector information and the like. If a character is stored in the form of dot pattern information, the dot pattern information is sent to the image memory 7. If a character is stored in the form of outline coordinate information, the outline coordinate information is converted into outline information having consecutive dots and the inside of the outline is filled, in accordance with a program stored in program ROM 5 under control of CPU 4, the obtained information being sent to the image memory 7. If a character is stored in the form of skeleton information in the character pattern memory 10, the skeleton information is converted similarly into dot pattern information and sent to the image memory 7.

If a figure drawing instruction is inputted from the host computer 2 to the host interface 9, CPU 4 generates dot patterns for the figure in accordance with a figure drawing program stored in program ROM 5 and sends them to the image memory 7.

After receiving data for one page of a printing sheet from the host computer 2, CPU 4 sends a print start instruction to the printer engine 3. A video interface 8 reads image data from the image memory 7 in sync with the print speed of the printer engine 3 and sends the image data to the printer engine 3.

At the host computer 2, print data is inputted from data input means, such as a floppy disk drive (FDD) 220. Under control of CPU 204, character pattern data for print characters of the inputted data are read from a character pattern memory 200 or from working RAM 206 as described later, and sent to an image memory 207. The content of the image memory 207 is thereafter read and displayed on a CRT display 208 to allow monitoring of the content of the print characters. According to the present invention, the host computer either stores no character pattern data at all, or stores in the character pattern memory 200 minimum character pattern data necessary for monitor display, for example, or character pattern data necessary for simple character print to be used temporarily while driving the printer engine directly from the host computer 2 during the failure of the printer controller or in other cases. For instance, for an enlarged character pattern, the printer controller prepares data for an enlarged pattern of actual dimension "A", whereas the host computer prepares data for a symbol representative of an enlarged pattern, e.g. "A←". Namely, according to the arrangement of this invention, character pattern data for characters to be printed out are stored as the main character pattern data in the character pattern memory 10 of the printer controller, whereas the host computer either dispenses with the conventional character pattern memory 200, or stores the abovedescribed minimum character pattern data in a small capacity character pattern memory 200 as the supplementary character pattern data. Therefore before a printing operation, character pattern data necessary for operations of the host computer are checked and identified through confirming the content of the character pattern memory 10, and the necessary character pattern data is read from the character pattern memory 10 of the printer controller and sent to the host computer.

Next, the operation of transferring character pattern data stored in the character pattern memory 10 to the host computer 2 will be described with reference to FIGS. 2 to 5 in conjunction with the block diagram shown in FIG. 1. At the start of the operation, the host computer issues an inquiry instruction for character pattern data stored at the printer controller. The printer controller or CPU 4 reads all the data within the memory 10 and transfers the data to the host computer. CPU 204 designates necessary character pattern data while referring to the content of the memory 200 if it is provided at the host computer, and sends back a character pattern transfer request code for requesting transfer of the necessary character pattern data to CPU 4 of the printer controller. CPU 4 reads the requested character pattern data from the memory 10 and transfers it to CPU 204 which stores it in working RAM 206.

Figure 2:
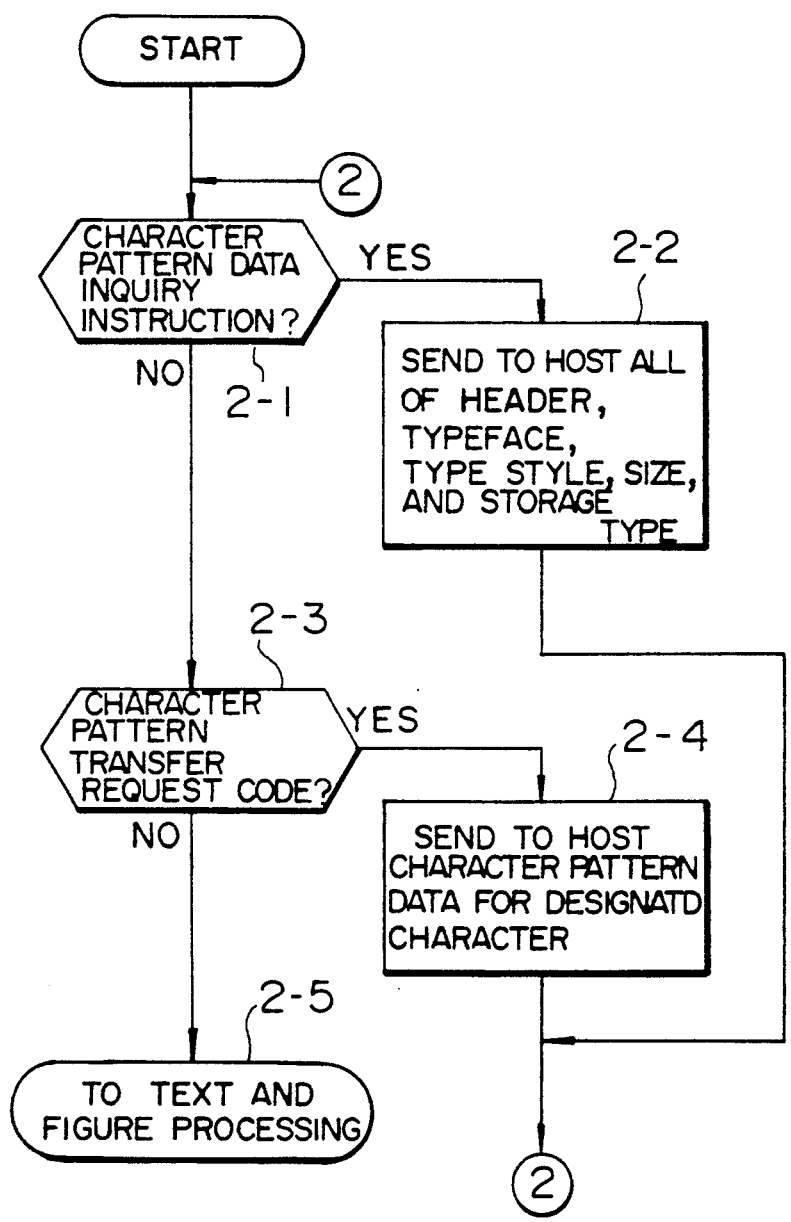
FIG. 2 is a flow chart illustrating an operation sequence of the printer controller for receiving data from the host computer in the embodiment shown in FIG. 1.

FIG. 2 is a flow chart showing the sequence of the above operations by CPU 4. Referring to FIG. 2, if the printer controller 1 receives a character pattern data inquiry instruction from the host computer 2 at step 2-1, the procedure advances to step 2-2 whereat the printer controller 1 sends the data indicated by reference numeral 20 in FIG. 3 to the host computer 2, and returns back to step 2-1. If the printer controller 1 receives at step 2-1 a character pattern transfer request code indicated by reference numeral 21 in FIG. 3, then through steps 2-3 and 2-4 the printer controller sends to the host computer the character pattern data indicated by reference numeral 22 in FIG. 3, and the procedure returns to step 2-1. If the character pattern transfer code is not detected at step 2-3, the procedure advances to text and figure process step 2-5. Each step will be described more in detail.

Figure 4:
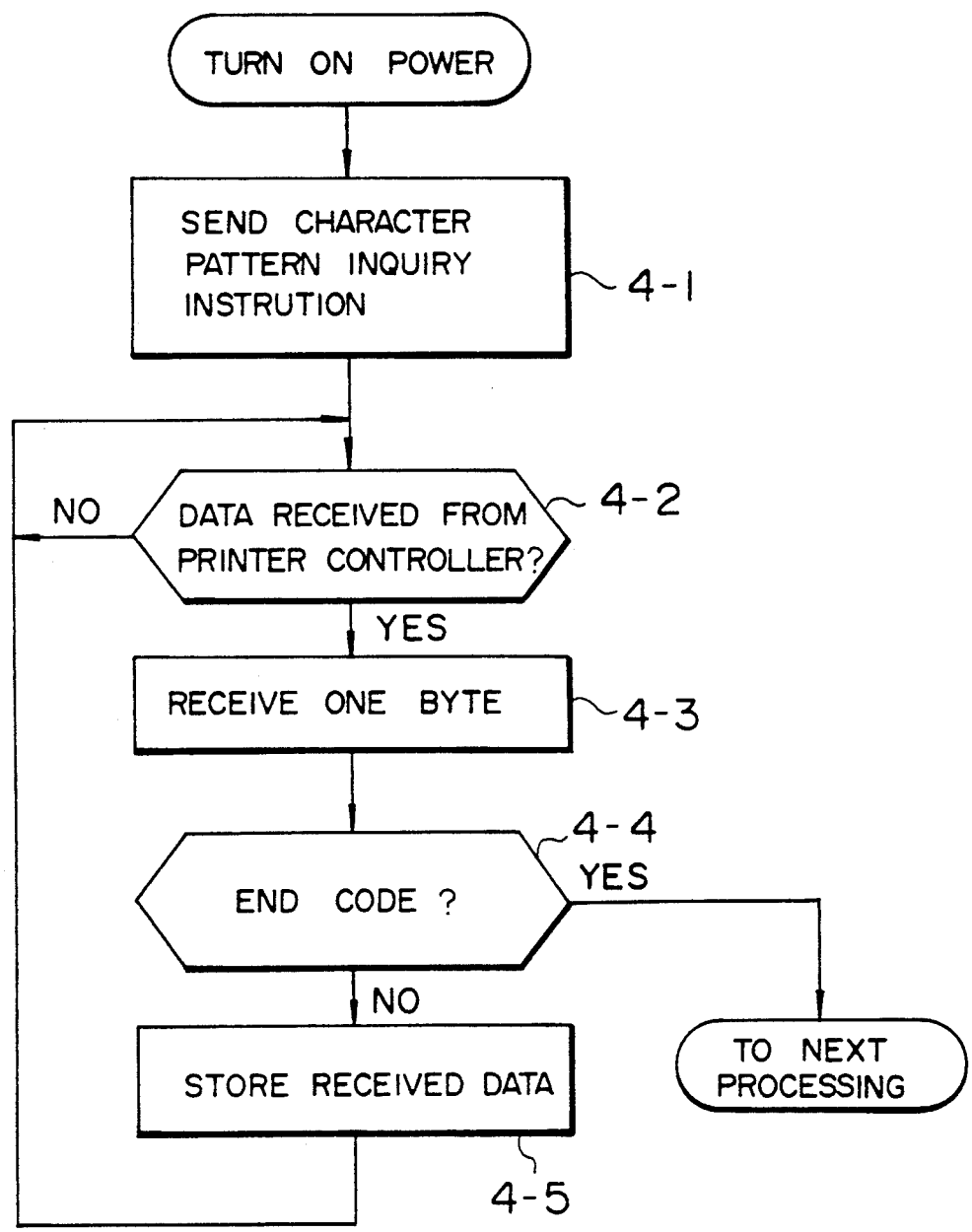
FIG. 4 is a flow chart illustrating an operation sequence of the host computer for inquiring the printer controller about the character pattern data stored in the character pattern memory in the embodiment shown in FIG. 1.

At the time of turning on the power, the host computer 2 is still not recognizing the character pattern data stored in the character patter memory 10 of the printer controller. Therefore, it is necessary to inquire of the printer controller 1 as performed at step 2-1. FIG. 4 is a flow chart showing the procedure to be executed by CPU 204 of the host computer 2 after turning on the power, to inquire what character pattern data is stored in the character pattern memory 10 of the printer controller.

Figure 3:
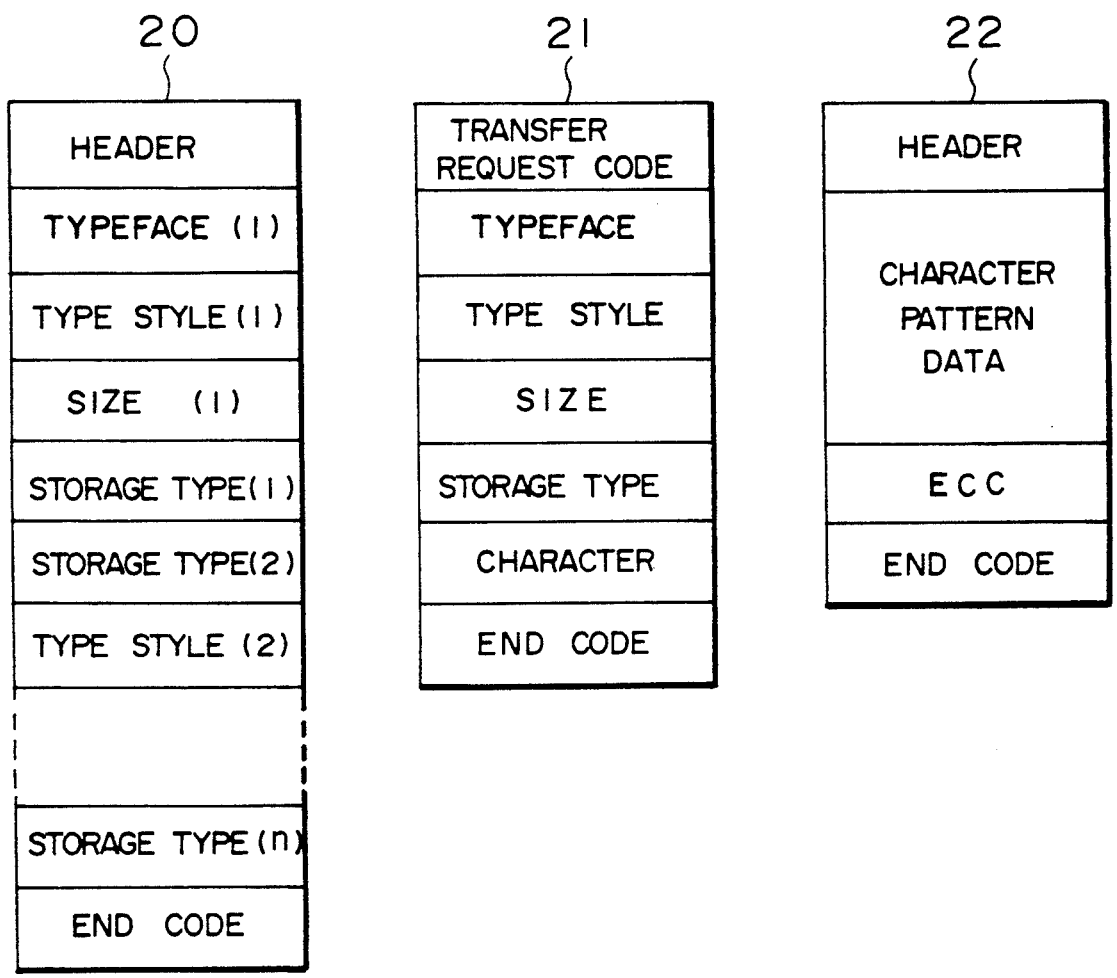
FIG. 3 shows contents of character pattern data and transfer sequence thereof.

Upon transfer of the character pattern data inquiry instruction from the host computer 2 to the printer controller (step 4-1), CPU 4 of the printer controller 1 transfers, to the host computer 2, the data each comprising one byte data indicated by reference numeral 20 in FIG. 3 which shows a sequence of transferring character pattern data. CPU 204 identifies a reception of the data 20 based on the header thereof (step 4-2). If received, CPU 204 checks the following one byte data to see if there is an end code or not (steps 4-3, 4-4). If not, the received data is stored in working RAM 206 to thereafter return to step 4-2. If affirmative, the procedure advances to the following steps 2-3 and the like.

The "header" of the data 20 in FIG. 3 indicates that the data following the header is for character pattern data stored in the character pattern memory 10. The "typeface" is binary coded information representative of, e.g., Ming style, Gothic style, and other styles of characters, and of only alphanumeric characters or characters including both alphanumeric characters and Chinese characters. The "type style" indicates a deformation of the typeface, e.g., an oblique character, a bold character and the like. The "size" indicates the scale of a character. This size information is not included in the character pattern data if it is of relative value data, such as outline coordinate data, skeleton vector data and the like, because such characters can be reduced or magnified as desired without degrading the character quality. The "storage type" is the information as to whether the character pattern data is dot patterns, outline coordinates, skeleton vectors or the like. After all the above-described information is transferred from the printer controller 1 to the host computer 2, the end code is transferred to terminate the sequence. (1) to (n) are used to number the types of character patterns in the data 20.

Figure 5:
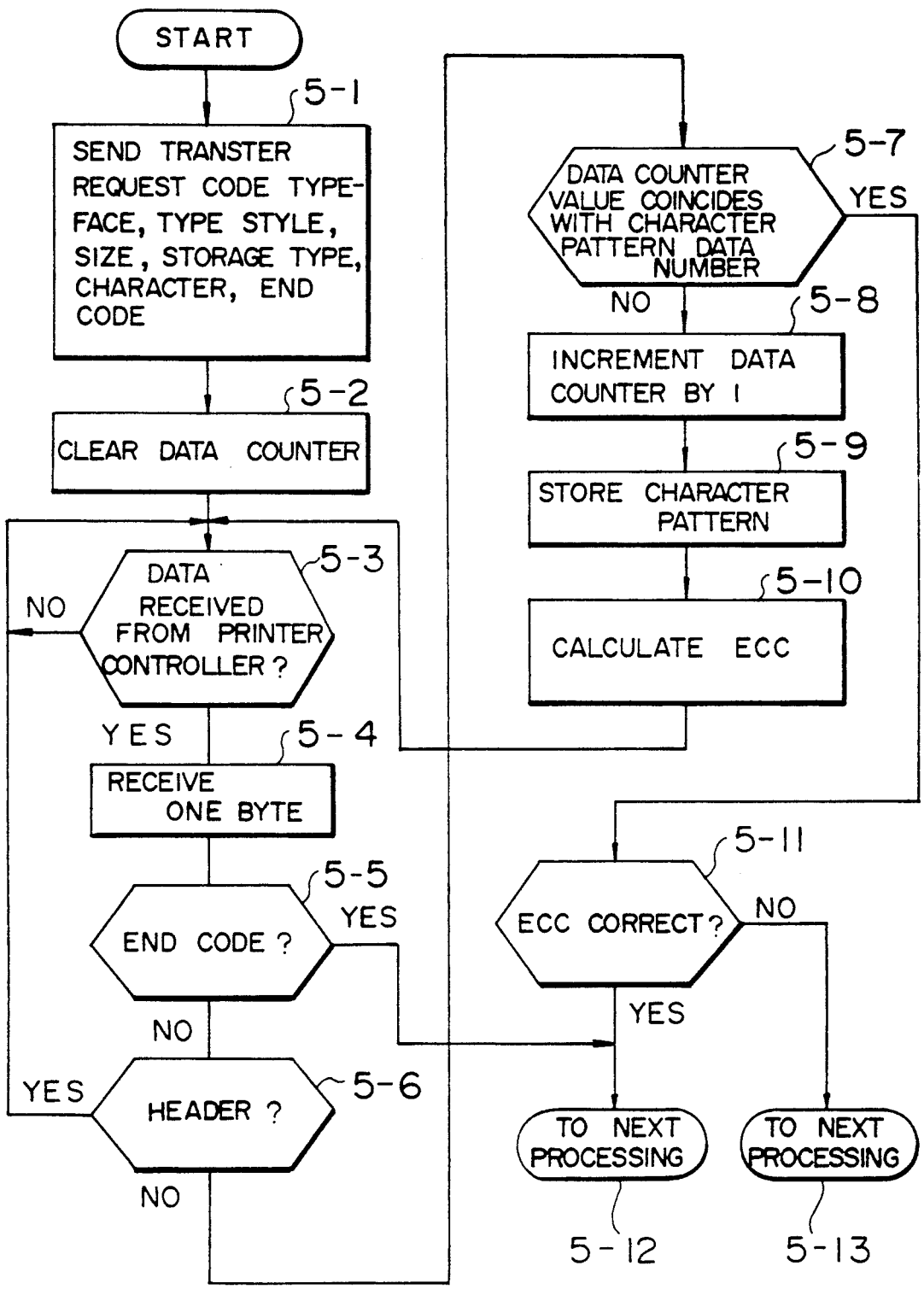
FIG. 5 is a flow chart illustrating an operation sequence of the host computer for receiving character pattern data from the printer controller.

FIG. 5 is a flow chart showing the procedure of the host computer 2 for sending a transfer request code and receiving the character pattern data from the printer controller 1.

CPU 204 of the host computer sends the transfer request code (step 5-1), the detail of the code is indicated by reference numeral 21 in FIG. 3, and clears its data counter (step 5-2). The transfer request code 21 designates a series of data constructed of a typeface, type style, size, storage type, character, and end code. The first one byte is a code representative of a transfer request. Next, the typeface and type style are designated. Then, the size is designated. In this case, if the character pattern data is relative value data, such as outline coordinates, skeleton vectors or the like, the CPU 4 performs, if necessary, desired magnification or reduction of a character, in accordance with programs stored in program ROM 5.

The "storage type" of the transfer request code shown in FIG. 3 is the information indicating how the character pattern data is stored, e.g., in the form of dot patterns, outline coordinates, skeleton vectors or the like. In this case, dot patterns are designated for the character pattern data stored in the character pattern memory 10 in the form of relative value data, such as outline coordinates, skeleton vectors and the like, and the CPU 4 converts such relative value data into dot patterns, in accordance with programs stored in program ROM 5.

Next, characters whose data must be transferred are designated. Not only one character, but also only alphanumeric characters or all characters belonging to "JIS Kanji Standard 1" can be designated. Lastly, the end code is transferred. For such designation of typeface, type style, size, storage type, character and the like, an operator inputs necessary data to the host computer. In the case that the host computer is provided with a character pattern memory 200, the data necessary host for operations of the host computer are identified through comparison between the content of the memory 200 and the character pattern data transferred from the printer controller at step 2-2. CPU 204 determines the designation based on the above data.

Upon reception of the transfer request code 2#, CPU 4 of the printer controller 1 transfers the data of a designated character in the order of data indicated by reference numeral 22 in FIG. 3, the reception of which data is checked by CPU 204 (steps 5-3 to 5-6).

The "header" of the data 22 shown in FIG. 3 indicates that the data following the header is for character pattern data. At the end of the character pattern data, there, is provided an error correction code (ECC) using a code such as CRC. The transfer is terminated at an end code. The "character pattern data" of the data 22 is composed of data including the "typeface" to "character" described with the data 21.

Upon reception of the data 22 shown in FIG. 3 from the printer controller 1, the host computer 2 checks to see if the data counter value coincides with a number of the necessary character pattern data (step 5-7). If not, the data counter is incremented by one at each byte (step 5-8). The data is stored in the memory (step 5-9), the error correction code is calculated (step 5-10), and the procedure returns to step 5-3 to repeat the above processes. If it is confirmed (step 5-7) from the, data counter value that all the necessary data has been received, it is checked to see if the calculated error correction code coincides with that transferred from the printer controller 2 (step 5-11). If not, an error process is executed (step 5-13). For instance, an error is indicated to the host computer to display an error notice on the CRT display, the transfer request code is again sent to the printer controller 1, and so on.

As the "necessary character pattern data number" at step 5-7 there is used a value stored through comparison among the input data by an operator, data in the character pattern memory 200, data transferred from the printer controller and the like.

As described previously, character pattern data transfer from the printer controller to the host computer is generally accompanied by conversion from high resolution pattern data into low resolution pattern data (obviously, the invention is not intended to exclude data transfer between the host computer and printer controller having pattern data of nearly the same resolution level). Therefore, such conversion requires a data sampling or thinning process. This thinning process may be realized by any one of (1) preparing, at the printer controller, data previously designed to match with resolution of the CRT display of the host computer, (2) using a thinning algorithm, and (3) using outline coordinate data.

As appreciated from the foregoing description, the data transfer process can be executed irrespective of the presence or absence of the character pattern memory 200 of the host computer. The advantageous effects of this invention will not be lost even for the case where, as appreciated by a representation of the character pattern memory 200 with a dotted line block in FIG. 1, the character pattern data is prepared less at the host computer 2 than at the printer controller 1, and the character pattern data not stored at the host computer is transferred thereto from the printer controller. With a minimum character pattern data stored at the host computer 2, the printer system will be able to operate by using the character pattern data stored at the host computer even in the event of a failure of the printer controller 1.

Figure 6:
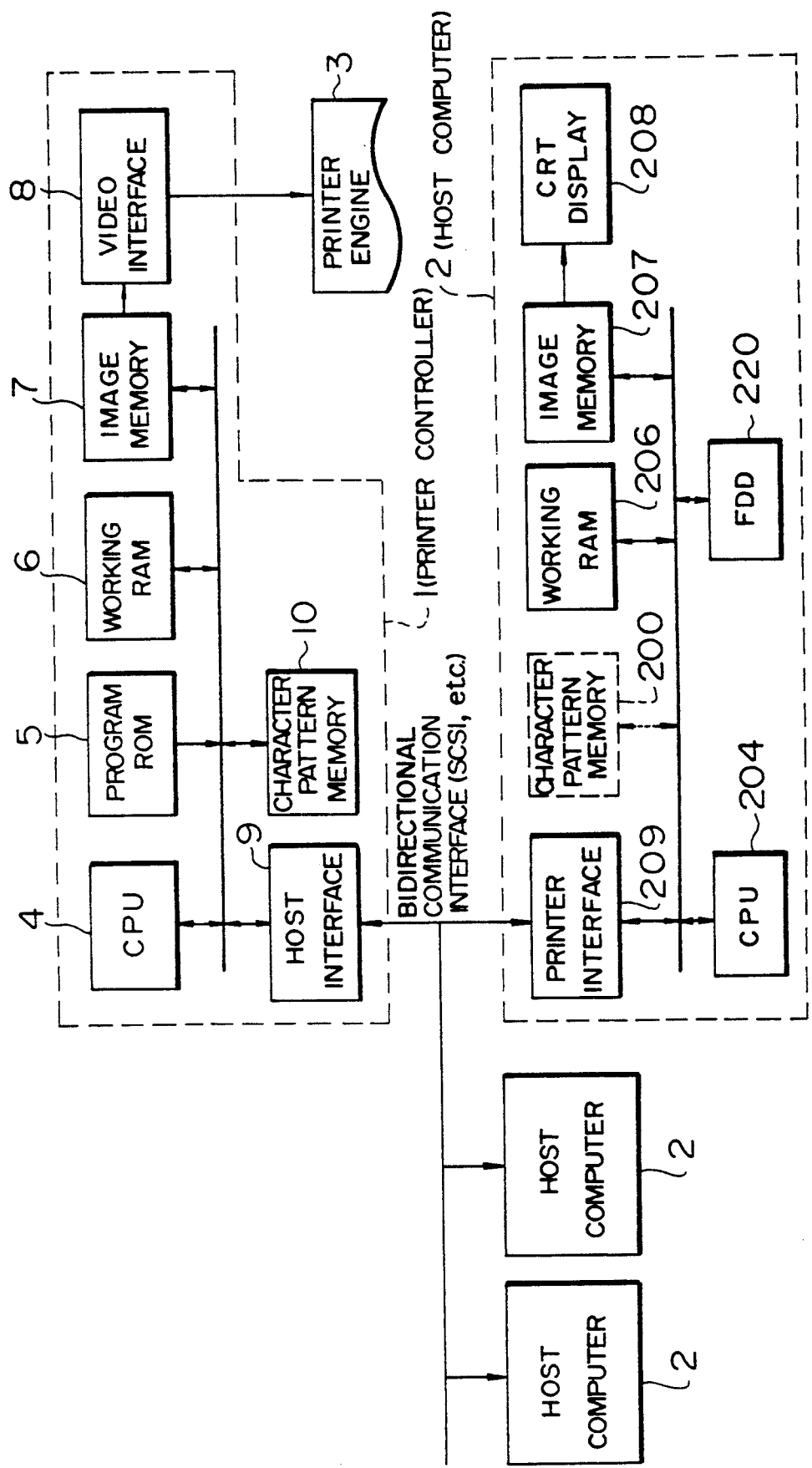
FIG. 6 is a block diagram showing an overall system arrangement using plural host computers according to another embodiment of the present invention applied to a photo printer.

FIG. 6 is a block diagram showing the overall system arrangement of another embodiment of the present invention applied to a photo printer.

In the embodiment shown in FIG. 6, a plurality of host computers 2 are connected to the printer controller 2 having a character pattern memory 10. The character pattern data at the printer controller 1 is transferred to the plurality of host computers 2. In this embodiment, character pattern data which is same as the character pattern data at the printer controller 1 is need not be prepared beforehand at each of the host computers, thus reducing the memory capacity of the overall system.

We claim:

1. A method of operating a printer system for printing out various images including character images by controlling via a printer controller a printer engine from at least one host computer, wherein said printer controller has memory means storing character pattern data for defining character images to be printed by said printer engine, and said host computer is adapted to receive input data for the printing of character images and to display character images by making use of character pattern data of said memory means of said printer; said method comprising:

a first step of storing in said memory means said character pattern data comprising characters and typefaces of said characters, including Ming style, Gothic style of alphanumerica and Chinese characters, type styles of said characters, including oblique characters and bold characters, and sizes and storage types of said characters, including dot patterns, outline coordinates and skeleton vectors;

a second step of reading, in response to input data, corresponding character pattern data from said memory means of said printer controller and producing character image data to enable said printer engine to print out the produced character image data;

a third step of selectively reading, in response to said input data, character pattern data representative of selected characters, and respective typefaces, type styles sizes and storage types of said characters from said memory means of said controller;

a fourth step of transmitting the selectively read character pattern data to said host computer; and a fifth step of displaying by said host computer character images corresponding to the transmitted character pattern data, thereby enabling reduction of capacity of the host computer memory capacity otherwise needed for storing such character pattern data for the display of character images.

2. A method according to claim 1, wherein said a plurality of host computers corresponding to said one host computer are connected to said printer controller, and any one of said host computers is adapted to receive character pattern data selectively read and transmitted from said memory means of said printer controller and to display said character pattern data by referring to the transmitted data.

3. A method according to claim 1, further comprising the steps of causing said host computer to inquire about types of character patterns of data stored in said memory means of said printer controller in response to power on operation of said printer system, and transmitting in response to the inquiry from said memory means of said printer controller to said host computer plural groups of data which indicate respective types of character patterns of data stored in said memory means of said controller, each group of data including information of at least one of typeface, typestyle, size and storage type of a respective pattern, thereby enabling said computer to identify the types of character patterns of the data stored in said memory means of said printer controller.

4. A method according to claim 1, wherein said third step includes transmitting said selectively read character pattern data read from said memory means of said printer controller to said host computer via a high speed bidirectional communication interface.

5. A method according to claim 4, wherein said printer controller contains a central processing unit and said memory means is in the form of a character pattern memory which stores said character pattern data; and wherein said second step includes reading by said central processing unit, in response to input data supplied from said host computer to said printer controller, the corresponding character pattern data from said character pattern memory of said printer controller and producing the character image data to enable said printer engine to print out the produced character image data.

6. A method of operating a printer system for printing out various images including character images by controller via a printer controller via a printer controller a printer engine from any one of a plurality of host computers, wherein said printer controller has memory means storing character pattern data for defining character images to be printed by said printer engine, and each of said host computers is adapted to receive input data for the printing of character images and to display character images by making use of character pattern data of said memory means of said printer; said method comprising the steps of:

storing is said memory means said character pattern data representative of characters and typefaces of said characters, including Ming style, Gothic style of alphanumeric and Chinese characters, type styles of said characters, including oblique characters and bold characters, and sizes and storage types of said characters, including dot patterns, outline coordinates and skeleton vectors;

reading in response to input data corresponding character pattern data from said memory means of said printer controller and producing character image data to enable said printer engine to print out the produced character image data;

selectively reading, in response to said input data, character pattern data representative of selected characters, and respective typefaces, type styles, sizes and storage types of said characters from said memory means of said printer controller; and transmitting the selectively read character pattern data to said one of said host computers for the display of corresponding character images by referring to the transmitted data, thereby enabling reduction of capacity of the host computer memories otherwise needed for storing such character pattern data for the display of character images.

* * * * *